United States Patent
Sun et al.

(10) Patent No.: US 9,535,959 B2
(45) Date of Patent: Jan. 3, 2017

(54) METHOD AND APPARATUS FOR RECONCILIATION OF MULTIPLE SETS OF DATA

(76) Inventors: Li Sun, Thousand Oaks, CA (US); Scott Michael Zoldi, San Diego, CA (US)

(*) Notice: Subject to any disclaimer, the term of this patent is extended or adjusted under 35 U.S.C. 154(b) by 1464 days.

(21) Appl. No.: 12/276,205

(22) Filed: Nov. 21, 2008

(65) Prior Publication Data
US 2010/0131526 A1   May 27, 2010

(51) Int. Cl.
*G06F 7/00* (2006.01)
*G06F 17/30* (2006.01)

(52) U.S. Cl.
CPC ... *G06F 17/30542* (2013.01); *G06F 17/30495* (2013.01)

(58) Field of Classification Search
CPC .............. G06F 17/30542; G06F 17/30563; G06F 17/30578; G06F 17/30575
USPC .............. 707/609, 610, 616, 687, 690, 758; 717/108; 705/28, 38
See application file for complete search history.

(56) References Cited

U.S. PATENT DOCUMENTS

| | | | | |
|---|---|---|---|---|
| 5,600,834 A | * | 2/1997 | Howard | 713/178 |
| 5,706,509 A | * | 1/1998 | Man-Hak Tso | 707/625 |
| 6,317,754 B1 | * | 11/2001 | Peng | 707/610 |
| 6,430,539 B1 | * | 8/2002 | Lazarus et al. | 705/7.31 |
| 6,470,329 B1 | * | 10/2002 | Livschitz | |
| 7,343,585 B1 | * | 3/2008 | Lau et al. | 717/108 |
| 7,640,273 B2 | * | 12/2009 | Wallmeier et al. | |
| 7,711,771 B2 | * | 5/2010 | Kirnos | 709/203 |
| 2006/0178954 A1 | * | 8/2006 | Thukral et al. | 705/28 |
| 2007/0179870 A1 | * | 8/2007 | Goodbody et al. | 705/30 |
| 2009/0070237 A1 | * | 3/2009 | Lew et al. | 705/28 |
| 2009/0076866 A1 | * | 3/2009 | Zoldi et al. | 705/7 |

OTHER PUBLICATIONS

J Hastings, "Nonreconciliation of third party claims: how much are we losing?". Journal of the American Pharmaceutical Association, Mar.-Apr. 2001;41(2):288. Date published: Jan. 1, 2001.*
Richmond University excel lab, Excel Lab 1: Calculations with Data Sets, Aug. 29, 2005.*

* cited by examiner

*Primary Examiner* — James Trujillo
*Assistant Examiner* — John J Morris
(74) *Attorney, Agent, or Firm* — Mintz Levin Cohn Ferris Glovsky and Popeo, P.C.

(57) ABSTRACT

A computer-implemented method for reconciling records from a plurality of data sets includes receiving a first data set from a left data source, retrieving data from the first data set, and placing the retrieved data from the first data set into a first abstract record from the left data source. The method also includes receiving a second data set from a right data source, retrieving data from the second data set, and placing the retrieved data from the second data set into a second abstract record from the right data source. The computer-implemented method also includes comparing the first abstract record and the second abstract record.

22 Claims, 6 Drawing Sheets

METHOD AND APPARATUS FOR RECONCILIATION OF MULTIPLE SETS OF DATA

BACKGROUND

This disclosure relates generally to reconciliation of two sets of data, and more particularly to methods and apparatus for reconciliation of multiple sets of data.

Reconciliation of two sets of data is required in many types of industries including, banking, telecommunication, retail and the like. There are many instances when various entities in an industry need to reconcile records to determine which entity is entitled to payment for more use of its system commonly referred to as arbitrage. Although there are certain standards related to many aspects of computer systems, there are really no standards for how electronic data is stored in various computer systems. Most likely, each entity has a one or more computer networks. Data and different representations of the data are stored in different ways depending on the needs/uses for the data by the different entities. Records may also need to be reconciled within an entity. In many instances, an entity will have multiple computer networks. Various groups within an entity will have different needs for data and each will configure differently to suite their particular needs. In short, there are many instances, including within an entity and between entities and even between industries, where the data may need to be reconciled between that store data in a different way or a different format. Due to configuration differences in different network systems, the data for a single event may be recorded by different network systems in different layouts or forms. In many instances, this makes reconciliation more important, as well as more complex to achieve.

Revenue assurance is one service industry that relies very heavily on technology for reconciling records between multiple data feeds. Revenue assurance compares records from multiple data feeds and identifies discrepancies that would lead to revenue leakage or over-billing of a service. In the telecommunications industry, for example, billable telephony records can be reconciled with the base signaling records as the billable telephony records pass through an organization's data collection, guiding, rating, and billing stages before the call appears as a line item on the customer's bill. Common issues include dropped billing records, incorrect start and end times, incorrect rating of the event, or inability to guide the billable record to the appropriate billable account. It has been estimated that as much as seven to fifteen percent of a telecommunications company's service goes unbilled due to revenue assurance issues.

Another example is related to web content delivery (e.g., ringtones, wallpapers, video clips, etc.), where the content is owned by third parties. Mobile companies are billed for their end customer's downloads and must ensure appropriate billing of the end customers. In yet another example, in the utilities industry, upwards of five to ten percent of capacity goes unbilled due to line leakage, un-metered lines, faulty meeting equipment, or fraud.

Not only are revenue assurance issues paramount to the profitability of an organization, these issues are also for compliance with numerous regulatory or governmental requirements, such as the Sarbanes-Oxley Act (SOX). Unfortunately, current techniques for detecting and resolving revenue assurance issues re inefficient, costly, and of limited effectiveness.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
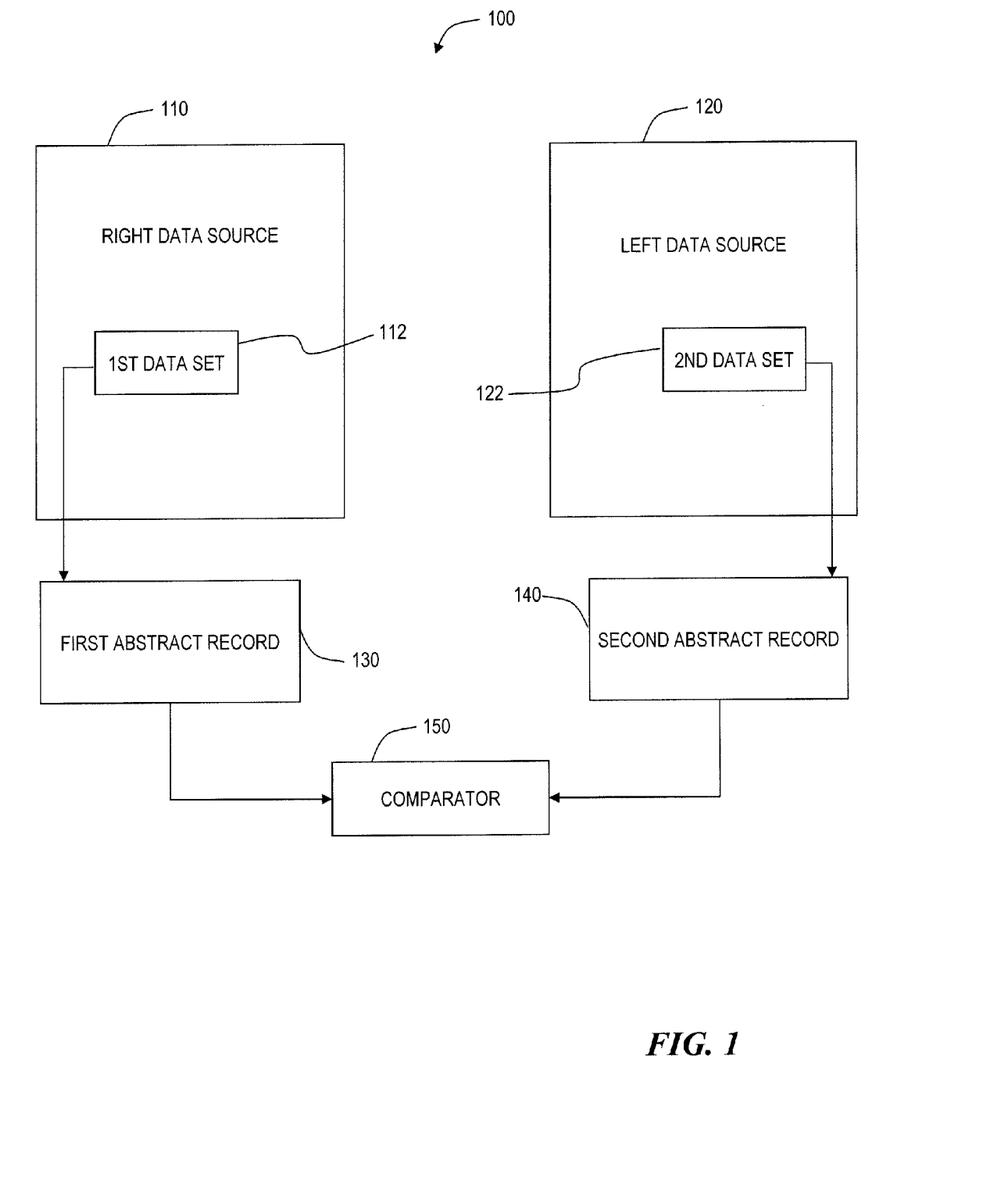
FIG. 1 is a schematic diagram of a reconciliation system, according to an example embodiment.

FIG. 1 is a schematic diagram of a reconciliation system 100, according to an example embodiment. The reconciliation system 100 can also be referred to as a data system 100. The reconciliation system 100 includes a first or right data source 110 and a second or left data source 120. The first or right data source 110 includes a first data set 112. The second or left data source 120 includes a second data set 122. It should be noted that the right data source 110 and the left data source can be different systems, such as different network systems. The different network systems can be formed at different times and do not have to match or generate data in one particular format. In fact, the different network systems can operate to generate data in different ways and in different formats. In fact, as the technology continues to advance, it is anticipated that more and more electronic data will be generated from or transferred between different network systems. Due to the configuration difference in different network system, the data for a single event recorded by different network systems, in many instances, will have different layout or format. Thus, reconciliation between the right data source 110 and the left data source 120 will become increasingly more important, and more complex to accomplish. The data system 100 also includes a first abstract record 130 and a second abstract record 140. The first abstract record 130 is an abstraction of the first data set 112 of the right data source 110. The first abstract record 130 is an abstraction of critical data needed to reconcile accounts or other information. The first abstract record 130 includes a format which is substantially similar to the format of the second abstract record 140 associated with the left data source 120. The second abstract record 140 is an abstraction of the second data set 122 of the right data source 120. The second abstract record 140 is an abstraction of critical data needed to reconcile accounts or other information. The first abstract record 130 and the second abstract record 140 is realized by dataset abstraction, record abstraction, data field abstraction and variable abstraction. The levels of abstraction eliminate the complexity of transaction type and records layout from the different data sets (first data set 112 and the second data set 122). The abstraction improves the model development efficiency. The reconciliation system or the data system 100 also includes a comparator 150 that compares the first abstract record 130 and the second abstract record 140 to determine if data matches or data does not match.

Figure 2:
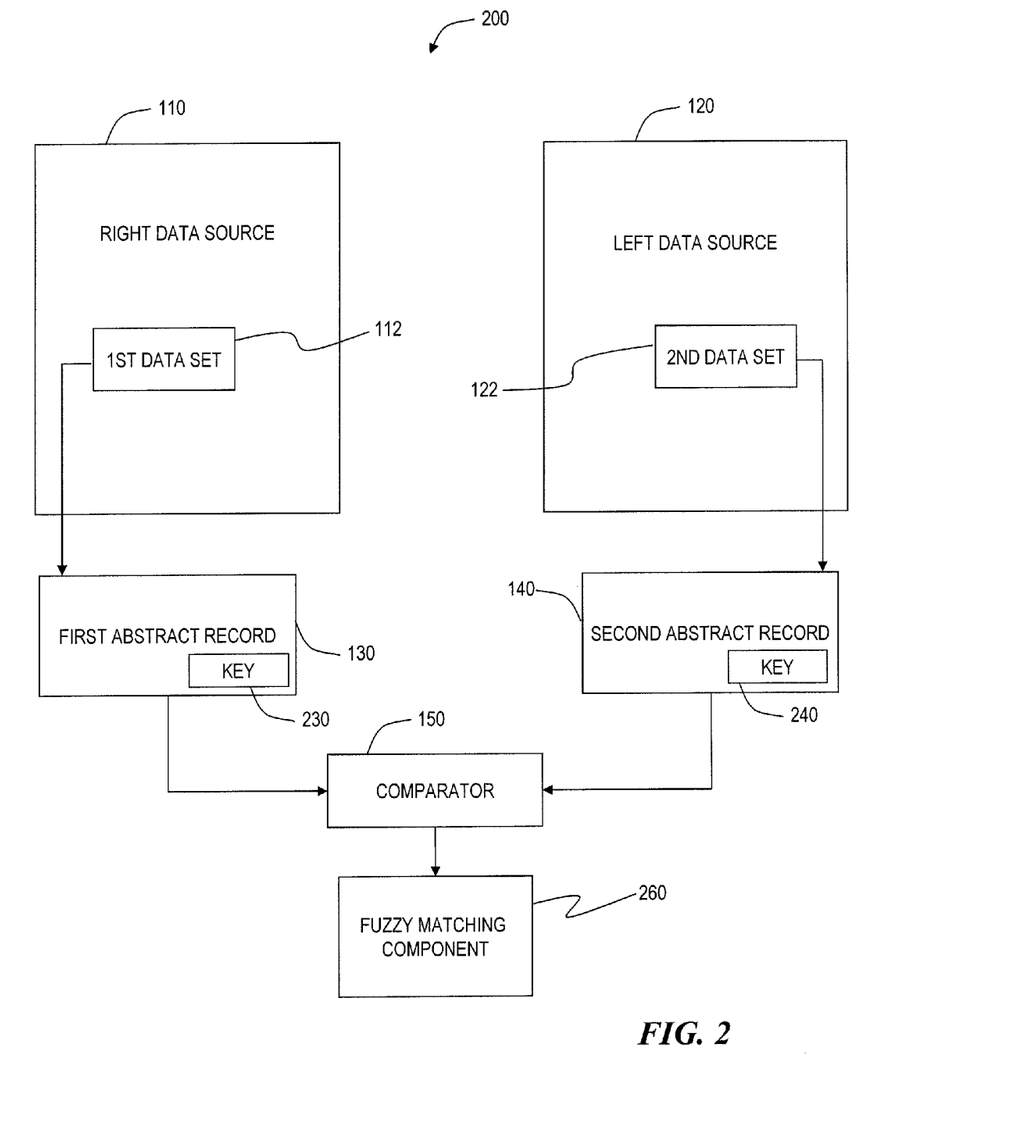
FIG. 2 is a schematic diagram of another embodiment of a reconciliation system, according to an example embodiment.

FIG. 2 is a schematic diagram of a reconciliation system 200, according to another example embodiment. The reconciliation system 200 can also be referred to as a data system 200. The reconciliation system or data system 200 includes many of the same elements as the reconciliation system or data system 100 shown in FIG. 1. Rather than repeat the description of many of the same elements, the discussion of FIG. 2 will relate to the differences between the reconciliation system or data system 100 and the reconciliation system or data system 200. The reconciliation system or data system 200 includes a right data or a first or right data source 110 and a second or left data source 120. The right data source 110 includes a first data set 112. The left data source include a second data set 122. The first abstract record 130 includes a key 230. The second abstract record 140 includes a key 240. Each key 230/240 is a unique portion of data used to identify a unique event from an original record data set, such as the first data set 112 from the right data source 110, and a second data set 122 from the left data source 120. In one embodiment, when at least key 230 and at least key 240 match, the event associated with the key 240 and the key 230 are assumed to be the same event. An event can be any type of transaction, such as a financial transaction or the like.

The reconciliation system or data system 200 also includes a fuzzy matching component 260. When the key 230 and the key 240 do not match, the comparator determines the difference between the keys 230, 240. The fuzzy matching component 260 is used to determine if the keys 230, 240 match. In other words, in some embodiments, a fuzzy match of the key 230 and the key 240 is allowed to identify the same event. The fuzzy matching component 260 or parts of the fuzzy matching component 260 can also be used to match other fields associated with the first abstract record 130 to data located in corresponding fields in the second abstract record 240. The use of the first abstract record 130 and the second abstract record 140 provides more tolerance to the data sets, such as the first data set 112 and the second data set 122, that do not have an exact common field, or compound field to identify the transaction.

Figure 3:
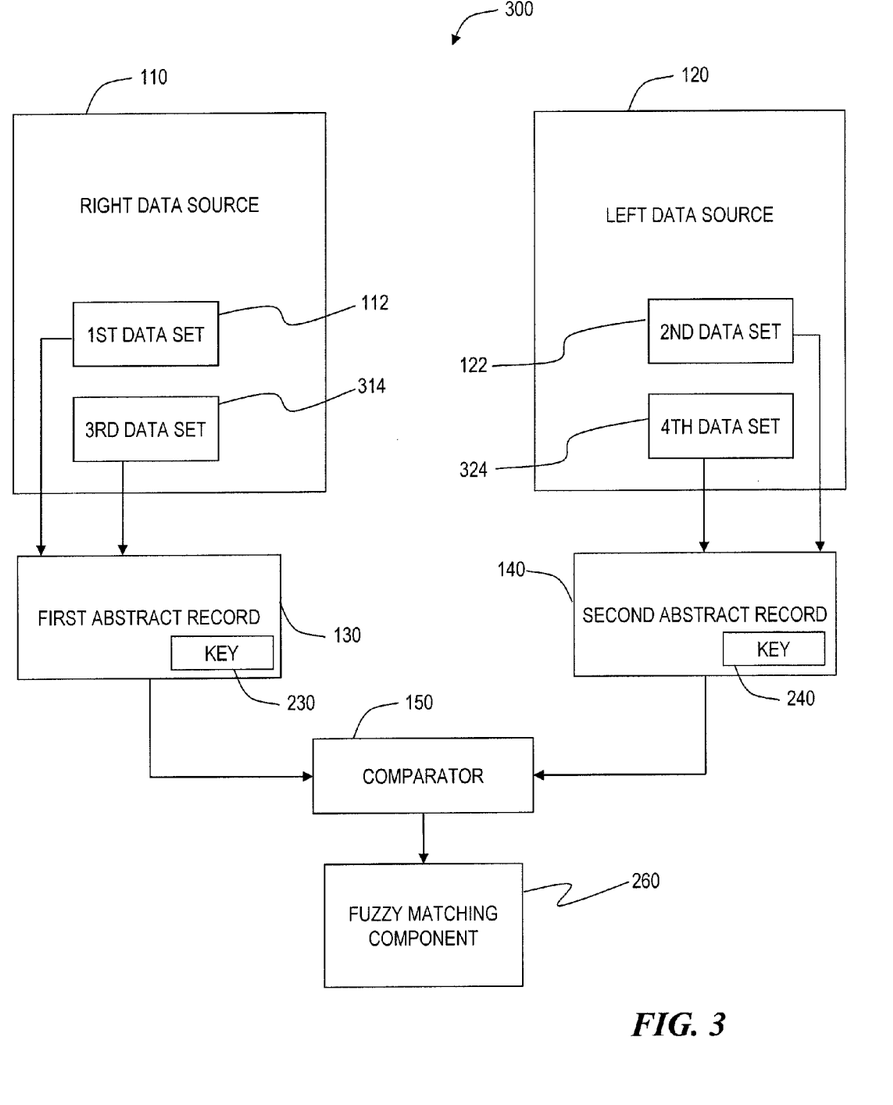
FIG. 3 is a schematic diagram of another embodiment of a reconciliation system, according to an example embodiment.

FIG. 3 is a schematic diagram of a reconciliation system 300, according to yet another example embodiment. The reconciliation system 300 can also be referred to as a data system 300. The reconciliation system or data system 300 includes many of the same elements as the reconciliation system or data system 100 and the reconciliation system or data system 300, shown in FIGS. 1 and 2. Rather than repeat the description of many of the same elements, the discussion of FIG. 3 will relate to the differences between the reconciliation systems or data systems 100, 200 and the reconciliation system or data system 300. The reconciliation system or data system 300 includes a third data set 314 associated with the first or right data source 110. The reconciliation system or data system 300 also includes a fourth data set 324 associated with the second or left data source 120. The first abstract record 130, can include data from a plurality of data sets associated with the right data source 110. In other words, the abstract record 130 can be formed from several data sets associated with a data source. This is quite common when different systems are associated with different functions of a large organization. Similarly, the second abstract record 140, can include data from a plurality of data sets associated with the right data source 120. In other words, the abstract record 140 can be formed from several data sets associated with the left data source 120. Again, the first abstract record 130 and the second abstract record 140 are compared by a comparator 150 and a match or mismatch is determined. In the event a mismatch is found, the fuzzy matching component 260 can be used to determine the severity of the difference and to determine if the first abstract record 130 matches the second abstract record 140. This can also be done with the keys 230, 240 associated with the first abstract record 130, and the second abstract record 140, respectively.

The reconciliation systems or data systems 100, 200 and 300, described above, are for serving sets of pieces of content to a user from a right data source and from a left data source. The data systems 100, 200 and 300, each includes a memory, and a data structure stored on said memory. The data structure includes a first abstract record 130 from the right data source 110, and a second abstract record 140 from the left data source 120. Each of the first abstract record 130 and the second abstract record 140 include: a key 230, 240 used to match the first abstract record 130 to the second abstract record 140, and at least one other piece of content of the set of pieces of content to be served that needs to be reconciled between the right data source 110 and the left data source 120. The data system 100, 200, 300, in some other embodiments, may further include, for each of the first abstract record and the second abstract record, a description of each piece of content including a name of the piece of content, a type of the piece of content, and a location of the piece of content. The piece of content may be a variable used to model an event, or a value from a data set.

Figure 4:
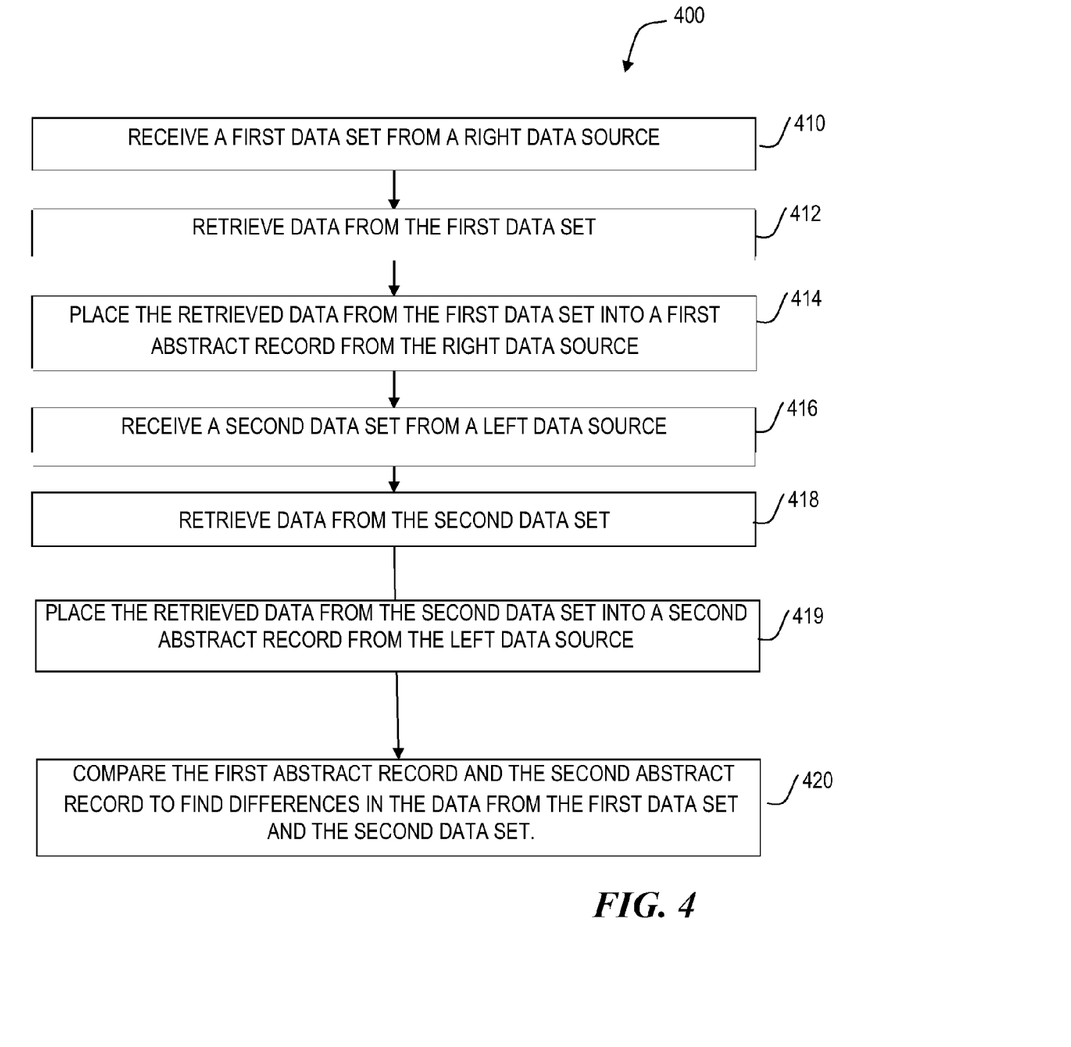
FIG. 4 illustrates a method for reconciling multiple sets of data according to an example embodiment.

FIG. 4 illustrates a method 400 for reconciling multiple sets of data according to an example embodiment. In one embodiment, the method 400 is a computer implemented method. The method 400 for reconciling records from a plurality of data sets includes receiving a first data set from a right data source 410, retrieving data from the first data set 412, and placing the retrieved data from the first data set into a first abstract record from the right data source 414. The method 400 also includes receiving a second data set from a left data source 416, retrieving data from the second data set 418, and placing the retrieved data from the second data set into a second abstract record from the left data source 419. The method 400 also includes comparing the first abstract record and the second abstract record to find differences in the data from the first data set and the second data set 420.

Figure 5:
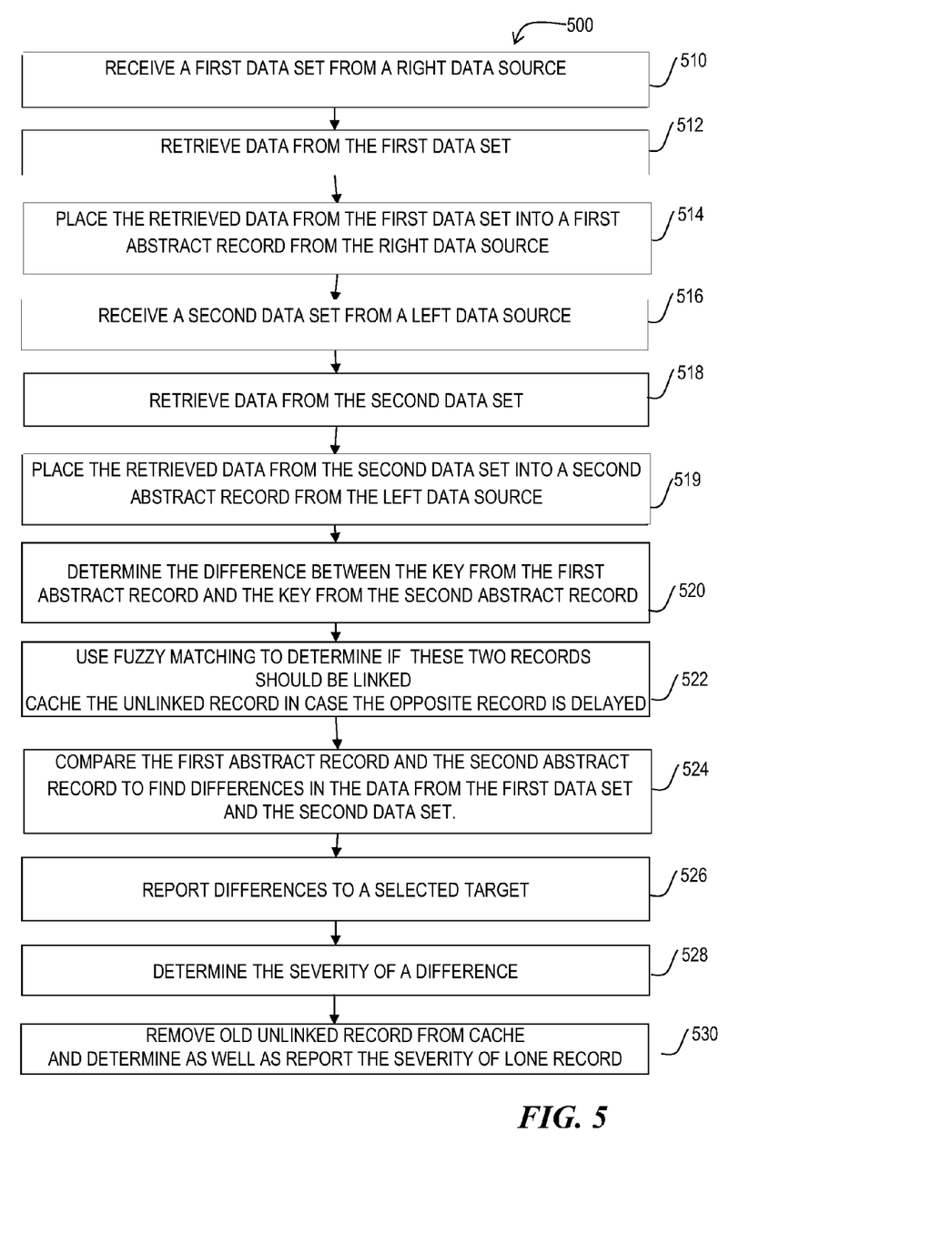
FIG. 5 illustrates another method for multiple sets of data according to an example embodiment.

FIG. 5 illustrates a method 500 for reconciling multiple sets of data according to an example embodiment. In one embodiment, the method 500 is a computer implemented method. The method 500 for reconciling records from a plurality of data sets includes receiving a first data set from a right data source 510, retrieving data from the first data set 512, and placing the retrieved data from the first data set into a first abstract record from the right data source 514. The method 500 also includes receiving a second data set from a left data source 516, retrieving data from the second data set 518, and placing the retrieved data from the second data set into a second abstract record from the left data source 519. The method 500 also includes determining the difference between the key from the first abstract record and the key from the second abstract record 520, and, when there is no difference, linking these two records. If there is a difference, the method 500 includes using fuzzy matching to determine whether these two records should be linked 522. The unlinked record will stay in cache to wait a certain period of time if the arriving of the opposite record is delayed. For the linked records the method 500 also includes comparing the first abstract record and the second abstract record to find differences in the data from the first data set and the second data set 524. The method 500 further includes reporting differences to a selected target 526. The differences can be measured, or accumulated. In some embodiments, the severity of a difference can be determined

528. Determining the severity of a difference 528 may include determining an analytic score to assign to the difference. The unlinked record cached for a certain period of time will be considered as lone record and removed from cache. The lone record will be reported as a type of data difference, as depicted by 530. The severity of lone records of a data source is measured and reported. In another embodiment, the severity of a difference 528 is determined by comparing different non-reconciliation rates of the left data source, and the right data sources to the historical rates of non-reconciliation for the left data source, and the right data source, respectively. By comparing the determined difference between the right data source and the left data source to the historical difference between the right data source and the left data source, a score that is indicative of the risk associated with changes in the rate of non-reconciliation events can be generated. The severity of the non-reconciliation issue, in some embodiments, is based on online moving averages of non-reconciliation. The score could also reflect the rate of change of the difference between the right and left data bases, as well as the severity. The amount of occurrences, the rate of change in the differences, and a comparison to a background are used to determine what is considered normal in terms of the amount of non-reconciliation.

In some embodiments, the left data source has a third data set. The method further includes: retrieving data from the third data set, and placing the retrieved data from the third data set into a first abstract record from the left data source. In some embodiments the right data source includes a fourth data set. The method further includes: retrieving data from the fourth data set, and placing the retrieved data from the fourth data set into a second abstract record from the right data source. In some embodiments, the first abstract record includes a key identifier from the left data source and the second abstract record includes a key identifier from the right data source.

One example embodiment is now described. To describe the reconciliation of two data sets, technically it can be as simple as: is collection [A] is equal to collection [A']. The collection [A] is equal to one or more data sets associated with the right data source 110. The collection [A'] is equal to one or more data sets associated with the left data source 120. If [A]=[A'], then the two data sets are identical, or say no discrepancy. If [A]≠[A'], then the two dataset has discrepancy and can not be 100% reconciled. To test if [A]=[A'], one needs to load records for [A] into memory and load records from [A'] to check (a) all records in [A'] exist in [A]; (b) all records in [A] exist in [A']; (c) the records that exist in both [A] and [A'] meet matching criteria for their respective data elements.

In realty, data sets are distinguished by the data definition and the source that generated this set of data. There are three possible reconciliation requirement scenarios. The first scenario is that the reconciliation is between one dataset [A] to another dataset [A']. The second scenario is that the reconciliation is between multiple data sets [A], [B], [C] . . . to one dataset [A']. The third scenario is between multiple data sets [A], [B], [C] . . . to multiple data sets [A'], [B'], [C'] . . . .

To simply these situations, the data sets required to reconcile as collection "Left" are abstracted, [LEFT], and the data sets required to reconcile collection "Right", [RIGHT] is also abstracted. The abstracted [LEFT] is equivalent to [A] and the abstracted [RIGHT] is equivalent to [A']. As mentioned above, both [LEFT] and [RIGHT] can be a single source of data or the combination data from different data source. In another word, [LEFT]=[A]+[B]+[C]+ . . . and [RIGHT]=[A']+[B']+[C']+ . . . . With this abstraction dataset notation, the reconciliation of all three scenarios described above can be described by [LEFT]=[RIGHT]. The multiple data sets cases can be processed in the same way as the reconciliation of one dataset to one dataset.

Based on this idea, a rule is applied first to set a "LEFT" flag to the data record "left" once it gets into system and then set a "RIGHT" flag to the data record "right". The first record with flag or either "LEFT" or "RIGHT" will be stored in system with time stamp. Once the other record with opposite flag arrives or after the waiting period is over, the reconciliation of this record is triggered. When the reconciliation is triggered it is the time to test if the left data record equals the right data record. Accomplishing the reconciliation usually can not be done by comparing the two records byte by byte since, many times, the records come from different network systems and do not have a common layout.

In many instances, not all fields associated with a particular record are needed to reconcile the records. As a result, a comparison is done of only the critical fields of the record. For example, reconciling a money transfer event, requires the critical information of the "transfer amount", "currency code", "transfer from" and "transfer to", "transaction point entry" and the like. These are the critical fields. In another example, a call detail record from a phone company, has critical fields for the "call duration", "call terminal number", "call time", "country code", "call cost" and the like. Rather than store and compare all fields of two records, only these critical fields are stored and compared for the purpose of reconciliation. The rest fields in the original record are ignored.

To accommodate all types of data record, a short "Abstract Record" layout for record comparison is designed with common "Abstract Field" names for the critical data. The Abstract Record, such as the first abstract record 130 and the second abstract record 140, has a "key" to identify the unique event in the original record data set, a 'timestamp' for tracking the creation time of the Abstract Record and data fields that are categorized in to three basic types, numeric, binary and string.

In one embodiment of an abstract record, the numeric fields representing quantities are abstracted as quantity_1, quantity_2, . . . , quantity_n; binary fields representing data with value of 0 or 1 are abstracted as binary_1, binary_2 . . . binary_n; and a set of string fields for the string values are abstracted as string_, string_2 . . . , string_n. The details are shown in Table 1 below. In addition, the abstract record has a field for the "count_left" and "count_right" to track the occurrence of the records to provide duplication information. The "count_reconciled" remembers the number of occurrence been reconciled.

Abstract Record Layout

TABLE 1

Example abstract record layout according to an example embodiment.

| Fields | Data Type | Comments |
| --- | --- | --- |
| Key | string; | |
| Date/TimeStamp | data time stamp; | |
| Count_left | Numeric | |
| Count_right | Numeric | |
| Count_reconciled | numeric | |
| Quantity_1 | numeric; | |

TABLE 1-continued

Example abstract record layout according to an example embodiment.

| Fields | Data Type | Comments |
|---|---|---|
| Quantity_2 | numeric; | |
| Quantity_3 | numeric; | |
| ... | | |
| Quantity_nq | numeric; | |
| Binary_1 | int; | 0 = false or no 1 = true or yes; |
| Binary_2 | int; | 0 = false or no 1 = true or yes; |
| Binary_3 | int; | 0 = false or no 1 = true or yes; |
| ... | | |
| Binary_nb | int; | 0 = false or no 1 = true or yes; |
| String_1 | string; | |
| String_2 | string; | |
| String_3 | string; | |
| ... | | |

In the model system, once a record dataset flag has been set, the next step is to extract data from the original record, such as the first data set 112 in the right data source 110, to the abstract fields and build the abstract record, such as the first abstract record 130. The abstract records are kept in a record table. After a new abstract record is built, the "key" is used to search the abstract record table, if a record with the key exists, detailed comparison on the record is performed, and otherwise the record is inserted into record table. However, sometimes it is hard or impossible to build an exact key from "left" and "right" data.

The count_left, count_right and count_reconciled provide the ability to use a fuzzy key match in the record search in record table. The fuzzy key matching is used when the key built from the data sets in the right data source 110 does not quite match the key built from the data sets in the left data source 120. A fuzzy matching component, 260, 360 is used to determine if the keys "match" even when the keys built from left and right are close to identical, but not exactly the same. Based on the data analysis, a tolerance range is designed to allow for a selected amount of variation between the right key 230 and the left key 240. If a key is falls within the range, it is considered as identical. Hence, it is expected that two or more unique transactions are treated as single transaction. The count_left and count_right is designed to track the occurrence of the fuzzy keys to left and right. As long as the count_left, count_right and count_reconciled are identical, all these records are reconciled. If count_left>count_right, then there is one or more "left" record missing paired "right" record and vise-versa.

The record comparison is carried on every data field of the abstract record. The abstract record layout simplifies the record comparison for all type of data in the abstract record. The procedure is simply to check of following condition:

Left.quantity_i=right.quantity_i and left.binary_i=right.binary_i and left.string_i=right.string_i.

If two records are not identical, the severity of the discrepancy is measured by the difference of the corresponded fields. For the quantity variables the differences are calculated by delta_quant_i=|left.quantity_i−right.quantity_i|; for the binary variables calculated by delta_quant_i=|left.binary_i−right.binary_i|. For the string variables, it is handled differently. Only two cases are considered, (a) left.string_i is identical to right.string_i, the delta_string_i is 0; (b) left.string_i is not identical to right.string_i, the delta_string_i is 1.

The difference of each variable calculated from the record are accumulated and summarized in the variables in the profile to measure the reconciliation status of the data sets. Each record, regardless the identical or having discrepancy, has contribution to the statistic variables in the profile.

Using the abstracted fields, a set of variables tracking the discrepancy and the quantity of the discrepancy was designed. The variable categories include basic statistics of all the abstract fields, a time series moving average of all abstract fields and the discrepancy measurement variables, and the event based moving average of non-reconciled events. Examples are "number of event", "number of non-reconciled event", "total quantity", "total of non-reconciled quantity", "volume of lone records", "rate of duplicate records", and the like.

With this design, a generic model framework is implemented including profile manipulation, variable calculation, modeling firing and scoring logic. This framework code can be applied to the reconciliation of any type of data. This design has been successfully applied to the reconciliation of credit card transactions in purchase airtime, money pack transactions in purchase airtime, cashed card transaction in purchase airtime, call event details of voice activity and SMS activity, data activity of wireless phone, MMS activity of wireless phone, and the like.

Outlier detection is then used to detect anomaly signals in time series data. The outliers can be caused by bad data such as missing data, abnormal behaviors and sometimes by business changes.

The usual method of outlier modeling is to study the historical data and set a boundary condition for each feature monitored. The boundary condition is then implemented in the feature detector variable calculation. After the model deployment, the feature variables are calculated using the live data and are compared against the boundary condition. The farther the distance from the boundary, the stronger the abnormal signal. This is a very effective method. This method was applied in the Revenue Assurance modeling to the features that should generate alerts if the value is high. A non-linear function to map the profile variables to the feature detectors are as follows[1]:

$$q(x_i) = \min\left\{\max\left\{0, \frac{x_i - q_p}{(q_s - q_r)/c}\right\}, C\right\} \qquad \text{(Equation 1)}$$

The feature detectors are bounded between 0 and some constant C so that each individual feature only contributes positively to the score, yet at the same time this contribution is limited so it cannot dominate other variables. The parameters $q_p$, $q_s$, $q_r$, and c are design parameters. The parameter $q_p$ denotes the value of the p-th percentile for the variable $x_i$, and c is a pre-defined tuning constant to control the effect of the extra-percentile range on the scaled variable. The values assigned to p, s, and r are dependent on implementation and problem definition, common settings used for fraud are variables scaled based on parameters p=r=95%, s=99%, and C=6. Methodologies have been developed for the parameters $q_p$, $q_s$, $q_r$, and c to be computed and estimated in real-time while the model runs in production.

Moreover, there are features defined by measuring the distance beyond dynamically calculated means. These types of variables are able to self-adjust to the changing environment. The value of the feature is therefore always based on a dynamically calculated mean in the real time. For this class of variables, the featured detector calculation equation is modified as:

$$q(x_i) = \min\left\{\max\left\{0, \frac{x_i - \mu_{real}}{\sigma_{real}/c}\right\}, C\right\} \quad \text{(Equation 2)}$$

In this equation, the $\mu_{real}$ is the mean calculated at real time, $\sigma_{real}$ is the standard deviation calculated in real time. In this example implementation, the mean and the standard deviation are calculated using pre-defined time-scales. Notice, the feature values are also constrained to be between 0 and C.

In a changing environment where the data is noisy and where estimates may not be reliably obtained on the historical data, online methods for estimating the quantiles of $q_p$, $q_s$, $q_r$ (or $\mu_{real}$, $\sigma_{real}$) are applied to the production environment. Determining the location of the tails of the distribution can be particularly enlightening as shifts on both sides of the distribution can point to abnormal behaviors. Both extreme high value and an extreme low value are anomalies that should trigger alerts. For example, the sales volume of a store could increase due to a promotion. The occurrence of increased sale activities, if not seen in the history data, will be detected as anomaly using the static parameter values from the historical data and the anomaly will be reported again and again until the business's sales resembles that of the past historical data. This behavior will cause a high, systematic, false positive rate, and hence cause an impact on the detection rate. If many stores have a changed behavior then the system built with static parameter values would lose the ability to detect a real anomaly because the system would be flooded with false positives.

Another situation is that the sales data are missing, the sales could go down to a level that is also abnormal. In the Revenue Assurance modeling system, both extreme low sales and extreme high sales are outliers to be detected. In the wireless telephone business, this situation occurs more frequently. A popular ringtone launch could cause the daily data download volume to increase significantly. A new plan or a fancy phone could bring in a lot of new customers. Meanwhile, a server error or network error could cause data to be lost, hence causing unusual low volume.

In addition to needing the ability for the system to adjust to changes in the variables distributions in real-time based on production distributions, there is another fundamental design requirement. In the design of any generic revenue assurance system, there will always be systematic background non-reconciliations which are due to data quality issues or file loss which might be systematic in nature. In this situation, a 'background' non-reconciliation rate needs to be estimated as for some customers a 0.4% non-reconciliation rate could be an extreme outlier based on a 0.1% background rate, vs 4% being an acceptable non-reconciliation rate for a background rate of 3.8%.

To address this problem, the short term moving average is normalized with a long term moving average. The feature variable is calculated as:

$$x_i = x^{tr} = \frac{x^{t1}}{x^{t2}} \quad \text{(Equation 3)}$$

The variable, $x^{tr}$, provides the trends of the volume change during the $t_1$ time period in comparison with the $t_2$ time period. For the ideal condition that the volume has no change in the period to time, $x^{tr}$ should be equal to 1. If the short term volume increases, the short term moving average, $x^{t1}$, will increase more then the long term moving average, $x^{t2}$. Hence the $x^{tr}$ will be greater than 1. If the short term volume decreases, the short term moving average, $x^{t1}$, will decrease more than the long term moving average, $x^{t2}$. In this case, the $x^{tr}$ will be smaller than 1. The changes will be detected and measured against the systematic background in non-reconciliation.

Lastly, a general additive model is then fit to combine the outliers from all feature detectors to generate an abnormality score.

$$\eta = \sum_{i=1}^{p} w_i q(x_i) \quad \text{(Equation 4)}$$

Here $\eta$ the abnormality score triggered by a transaction, a linearly weighted (with the weights $w_i$) sum of p transformed feature detectors $q(x_i)$, where the profile variables $(x_1, \ldots, x_p) \in X$. The weights $w_i$ are determined through expert knowledge or through supervised model training based on historical data[1].

The score is normalized in the range from 1-999. The higher the score, the larger the discrepancy is between the reconciled data sets. The score is output with each transaction. The reconciliation flag is also set and output for each transaction.

Figure 6:
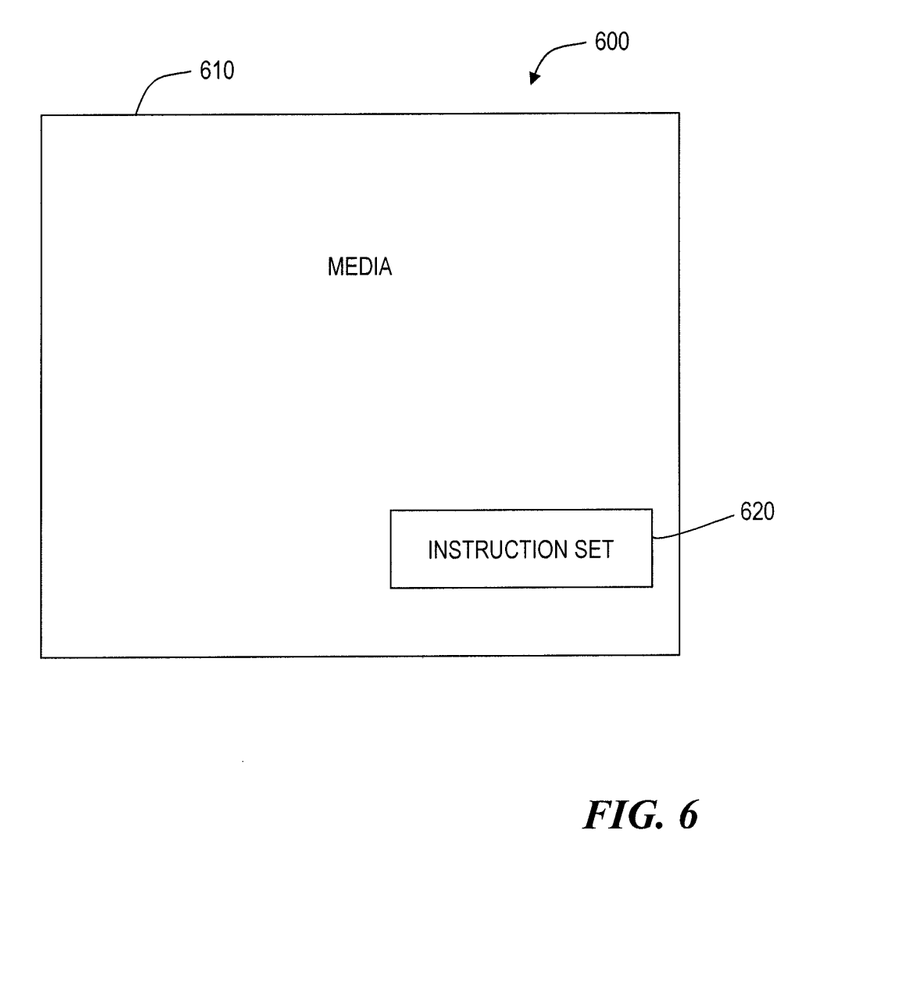
FIG. 6 is a block diagram of a media and an instruction set, according to an example embodiment.

FIG. 6 is a block diagram of a media and an instruction set 600, according to an example embodiment. In one embodiment, the media 610 and the instruction set 620 are computer-readable or machine readable. The computer-readable or machine readable instructions stored on a computer-readable or machine readable medium are executable by the processing unit of the computer. A hard drive, CD-ROM, and RAM are some examples of articles including a computer-readable medium. The machine readable medium 610 provides instructions 620 that, when executed by a machine, cause the machine to: receive a first data set from a left data source, retrieve data from the first data set, and place the retrieved data from the first data set into a first abstract record from the left data source. The machine readable medium 610 also provides instructions 620 that, when executed by a machine, cause the machine to: receive a second data set from a right data source, retrieve data from the second data set, and place the retrieved data from the second data set into a second abstract record from the right data source. The machine readable medium 610 also causes the machine to compare the first abstract record and the second abstract record to find differences in the data from the first data set and the second data set. In some embodiments, the machine readable medium 610 includes instructions 620 that further cause the machine to measure the difference in the data. In still other embodiments, the machine readable medium 610 provides instructions 620 that further cause the machine to: identify a key in the first abstract record, identify a key in the second abstract record, compare the keys, and measure the difference between the keys. In still further embodiments, the instructions 620 further cause the machine to: apply fuzzy matching to the keys when a difference between the keys is found, and determine if the keys reconcile. If the left data source has a third data set, and the machine readable medium 610 provides instructions 620 that further cause the machine to: retrieve data from the third data set, and place the retrieved data from the third data set into a first abstract record from the left data source. Similarly, if the right data source includes a fourth data set, the machine readable medium 610 provides instructions 620 that further cause the machine to: retrieve data from the fourth data set; and place the retrieved data from the fourth data set into a second abstract record from the right data source.

In another embodiment, the instructions associated with a media cause a machine or information handling system to:

(1) receive record from first dataset
(2) extract the data from the first dataset
(3) place extracted data into abstract record 130
(4) search the abstract record storage to using key of abstract record 130 to find the mirrored record from the second dataset (e.g 140). If 140 is found, go to step (11). If not found go to step (5).
(5) place the first abstract record 130 into storage (Array or data base in memory or on disk)
(6) receive record from the second dataset
(7) extract the data from the second dataset
(8) place extracted data into abstract record 140
(9) search the abstract record storage to using key of abstract record 140 to find the mirrored record from the first dataset (e.g, abstract record 130). The fuzzy matching component (260) is applied for searching the abstract records in abstract record storage from opposite dataset. If 130 is found, go to step (11). If not found go to step (10).
(10) place the first abstract record 140 into storage (Array or data base in memory or on disk), and
(11) compare 130 and 140 using comparator 150.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, an instruction set, a machine-readable set of instructions, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes, methods, and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed is:

1. A computer-implemented method for reconciling records from a plurality of data sets, the method comprising:
   receiving, by at least one data processing apparatus, a first data set from a right data source;
   retrieving, by at least one data processing apparatus, data from the first data set;
   placing, by at least one data processing apparatus, the retrieved data from the first data set into a first abstract record from the right data source;
   build, from the first data set in the right data source, a first key in the first abstract record;
   build, from the second data set in the left data source, a second key in the second abstract record;
   receiving, by at least one data processing apparatus, a second data set from a left data source;
   retrieving, by at least one data processing apparatus, data from the second data set;
   placing, by at least one data processing apparatus, the retrieved data from the second data set into a second abstract record from the left data source;
   comparing, by at least one data processing apparatus, using fuzzy matching, the first key and the second key to find differences in the data from the first data set and the second data set;
   determining, by at least one data processing apparatus, severity of a difference by (1) comparing determined non-reconciliation rates of the left data source with historical non-reconciliation rates of the left data source and comparing determined non-reconciliation rates of the right data source with historical non-reconciliation rates of the right data source, and (2) calculating, by at least one data processing apparatus, a rate of change of the differences in the data from the first data set and the second data set; and
   reporting, by at least one data processing apparatus, the severity to a second a data processing apparatus.

2. The method of claim 1, further comprising reporting, by at least one data processing apparatus, differences to a selected target.

3. The method of claim 2, wherein the differences are measured.

4. The method of claim 2, wherein the differences are accumulated.

5. The method claim 1, wherein determining the severity of a difference includes determining an analytic score to assign to the difference, the analytic score being indicative of risk associated with changes in the non-reconciliation rates of the left data source and the right data source.

6. The method of claim 1, wherein the right data source includes a third data set, and wherein the method further includes:
   retrieving, by at least one data processing apparatus, data from the third data set; and
   placing, by at least one data processing apparatus, the retrieved data from the third data set into the first abstract record from the right data source.

7. The method of claim 6, wherein the left data source includes a fourth data set, and wherein the method further includes:
   retrieving, by at least one data processing apparatus, data from the fourth data set; and
   placing, by at least one data processing apparatus, the retrieved data from the fourth data set into the second abstract record from the left data source.

8. The method of claim 1, wherein the first key and the second key each identify a corresponding financial transaction.

9. The method of claim 8, further comprising:
   determining, by at least one data processing apparatus, the difference between the first key in the first abstract record and the second key in the second abstract record, and when there is no difference, linking these two records.

10. The method of claim 8, further comprising:
    determining, by at least one data processing apparatus, the difference between the first key in the first abstract record and the second key in the second abstract record; and if there is a difference, using fuzzy matching, by at least one data processing apparatus, to determine if these two records should be linked.

11. The method of claim 1, wherein the severity is a numerical score that represents the non-reconciliation rate of the left data source compared with the historical non-reconciliation rate of the left data source.

12. A non-transitory machine readable medium that provides instructions that, when executed by a machine, cause the machine to:
    receive a first data set from a right data source;
    retrieve data from the first data set;
    place the retrieved data from the first data set into a first abstract record from the right data source;
    receive a second data set from a left data source;
    retrieve data from the second data set;
    place the retrieved data from the second data set into a second abstract record from the left data source;
    build, from the first data set in the right data source, a first key in the first abstract record;
    build, from the second data set in the left data source, a second key in the second abstract record;
    compare, using fuzzy matching, the first key and the second key to find differences in the data from the first data set and the second data set; and determining severity of a difference by (1) comparing determined non-reconciliation rates of the left data source with historical non-reconciliation rates of the left data source and comparing determined non-reconciliation rates of the right data source with historical non-reconciliation rates of the right data source, and (2) calculating, by at least one data processing apparatus, a rate of change of the differences in the data from the first data set and the second data set; and reporting, using a data processing apparatus, the severity to a second data processing apparatus.

13. The machine readable medium of claim 12 that provides instructions that further cause the machine to measure the differences in the data.

14. The machine readable medium of claim 12 that provides instructions that further cause the machine to:
identify the first key in the first abstract record;
identify the second key in the second abstract record;
compare the first key and the second key; and
measure the difference between the first key and the second key.

15. The machine readable medium of claim 14 that provides instructions that further cause the machine to:
apply fuzzy matching to the first key and the second key when a difference between the first key and the second key is found; and
determine if the first key and the second key reconcile.

16. The machine readable medium of claim 12, wherein the right data source includes a third data set, and wherein the machine readable medium provides instructions that further cause the machine to:
retrieve data from the third data set; and
place the retrieved data from the third data set into the first abstract record from the right data source.

17. The machine readable medium of claim 16, wherein the left data source includes a fourth data set, and wherein the machine readable medium provides instructions that further cause the machine to:
retrieve data from the fourth data set; and
place the retrieved data from the fourth data set into the second abstract record from the left data source.

18. A data system for serving a set of pieces of content to a user from a right data source and from a left data source, the data system comprising:
a memory; and
a data structure stored on said memory, said data structure comprising:
a first abstract record from the right data source; and a second abstract record from the left data source, each of the first and the second abstract record including:
a first key, built from a first data set in the right data source and a second key built from a second data set in the left data source, used to match the first abstract record to the second abstract record, the first key and the second key each indicating a corresponding financial transaction;
at least one other piece of content of the set of pieces of content to be served that needs to be reconciled between the right data source and the left data source; and
a comparator component for comparing, using fuzzy matching, the value from the first key in the first abstract record to the value from the second key in the second abstract record, the comparator component configured to determine a severity of a difference by (1) comparing determined non-reconciliation rates of the left data source with historical non-reconciliation rates of the left data source and comparing determined non-reconciliation rates of the right data source with historical non-reconciliation rates of the right data source, and (2) calculating, by at least one data processing apparatus, a rate of change of the differences in the data from the first data set and the second data set; and
reporting, using a data processing apparatus, the severity to a second a data processing apparatus.

19. The data system of claim 18, further comprising for each of the first abstract record and the second abstract record, a description of each piece of content including a name of the piece of content, a type of the piece of content, and a location of the piece of content.

20. The data system of claim 19 wherein the piece of content includes a variable used to model an event.

21. The data system of claim 19 wherein the piece of content of the first abstract record includes a value from the first data set and the piece of content of the second abstract record includes a value from the second data set which corresponds to the value of the first data set and which must be reconciled.

22. The data system of claim 18 further comprising:
a fuzzy matching component for determining if the key from the first data set matches the key from the second data set.

* * * * *